United States Patent [19]

Abel et al.

[11] 4,322,415

[45] Mar. 30, 1982

[54] STABLE CONCENTRATED LIQUID PREPARATIONS OF METAL COMPLEX DYES

[75] Inventors: Heinz Abel, Reinach; Paul Hugelshofer, Muttenz; Arthur Bühler, Rheinfelden, all of Switzerland

[73] Assignee: Ciba-Geigy Corporation, Ardsley, N.Y.

[21] Appl. No.: 159,256

[22] Filed: Jun. 13, 1980

Related U.S. Application Data

[63] Continuation of Ser. No. 870,901, Jan. 19, 1978, abandoned.

[30] Foreign Application Priority Data

Jan. 24, 1977 [LU] Luxembourg ............................ 76632

[51] Int. Cl.³ .................. D06P 1/10; D06P 1/647; D06P 1/90
[52] U.S. Cl. ............................... 424/226; 8/582; 8/583; 8/585; 8/588; 8/594; 8/595; 260/410.6; 260/410.7; 260/410.8; 260/208
[58] Field of Search .................. 260/410.6, 410.7, 410, 260/208; 8/181, 594, 597, 598, 621, 917, 582, 583, 585, 588, 595; 424/226

[56] References Cited

U.S. PATENT DOCUMENTS

| | | | |
|---|---|---|---|
| 3,211,514 | 10/1965 | Conty et al. | 8/93 |
| 3,736,096 | 5/1973 | Nichols et al. | 8/62 |
| 3,765,831 | 10/1973 | Senez | 8/54 |
| 3,960,486 | 6/1976 | Daubach et al. | 8/79 |
| 3,986,827 | 10/1976 | Dombchiu | 8/41 B |
| 4,042,320 | 8/1977 | Becker et al. | 8/39 C |
| 4,055,393 | 10/1977 | Schafer et al. | 8/62 |
| 4,071,468 | 1/1978 | Abel et al. | 8/92 X |
| 4,110,073 | 8/1978 | Mollet et al. | 8/85 R |

FOREIGN PATENT DOCUMENTS

| | | | |
|---|---|---|---|
| 873231 | 6/1971 | Canada | 8/45 |
| 2414455 | 10/1975 | Fed. Rep. of Germany | 8/621 |
| 1110025 | 4/1968 | United Kingdom | 8/621 |
| 1400580 | 7/1975 | United Kingdom | 8/621 |
| 1417039 | 12/1975 | United Kingdom | 8/621 |

*Primary Examiner*—Floyd D. Higel
*Attorney, Agent, or Firm*—Edward McC. Roberts

[57] ABSTRACT

Stable concentrated liquid preparations of metal complex dyes are provided. These preparations contain (1) a metal complex dye, (2) a non-ionic compound having a hydrotropic action and at least one of components (3) or (4), component (3) being a reaction product of a fatty acid having 8 to 22 carbon atoms and 1 to 2 mols of diethanolamine and component (4) being a compound of the formula

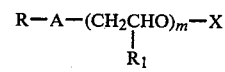

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

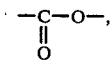

X is the acid radical of an inorganic, oxygen-containing acid, the acid radical of a polybasic carboxylic acid or a carboxyalkyl radical and m is a number from 1 to 50, and (5) water, a water-soluble organic solvent having a boiling point of at least 80° C. or a mixture of the two and (6) optionally conventional formulating agents. The preparations have a good stability on storage over a broad temperature range and can be diluted with water and/or organic solvents without precipitating the dye or producing other inhomogeneities. The preparations are useful for preparing padding liquors, dye baths printing pastes and spray solutions.

32 Claims, No Drawings

STABLE CONCENTRATED LIQUID PREPARATIONS OF METAL COMPLEX DYES

This is a continuation of application Ser. No. 870,901, filed on Jan. 19, 1978, now abandoned.

The present invention relates to stable concentrated liquid preparations of metal complex dyes which contain (1) metal complex dyes, (2) non-ionic compounds having a hydrotropic action and at least one of components (3) or (4), component (3) being a reaction product of a fatty acid having 8 to 22 carbon atoms and 1 to 2 mols of diethanolamine and component (4) being a compound of the formula

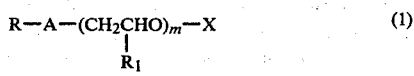  (1)

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

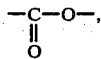

X is the acid radical of an inorganic, oxygen-containing acid, the acid radical of a polybasic carboxylic acid or a carboxyalkyl radical and m is a number from 1 to 50, and (5) water, a water-soluble organic solvent having a boiling point of at least 80° C. or a mixture of the two and (6), optionally, conventional formulating agents.

The invention also relates to a process for the manufacture of the liquid preparations and to their use for the preparation of padding liquors, dye baths, printing pastes or spray solutions which are used, in particular, for dyeing and printing textile materials and leather. The metal complex dyes are preferably those which are sparingly soluble (solubility up to about 60 g/l and preferably up to about 30 g/l) to insoluble in water.

Metal complex dyes are, for example, 1:1 or 1:2 metal complexes of azo or azomethine dyes or metallised phthalocyanines, especially copper phthalocyanines and nickel phthalocyanines. The 1:1 and 1:2 metal complexes are preferably 1:1 nickel complexes, 1:1 copper complexes, 1:1 chromium complexes or symmetrical or asymmetrical 1:2 cobalt complexes or 1:2 chromium complexes of, in particular, o-carboxy-o'-hydroxy-, o-hydroxy-o'-amino- or o,o'-dihydroxy-azo dyes of the benzene-azo-benzene, naphthalene-azo-naphthalene, benzene-azo-naphthalene, benzene-azo-pyrazolone, benzene-azo-pyridone or benzene-azo-acetoacetic acid amide type, it being possible for these groupings to be unsubstituted or substituted. Possible substituents are, for example: carboxyl, sulphonic acid, substituted or unsubstituted sulphonamide, halogen or nitro.

The dyes can be mono-, dis- or poly-azo dyes and these can also be in the form of salts of amines, for example of rhodamine B, isopropylamine or methyl-branched alkylamines having, for example, 5 to 21 carbon atoms $(CH_3)_2CH\ CH_2[(CH_3)_2C\ CH_2]_{0-4}\ CH_2NH_2$.

The copper phthalocyanines and nickel phthalocyanines used according to the invention are derived from the conventional mixtures of differing degrees of sulphonation and contain preferably 2 to 3 or also 4 sulphated sulphonic acid β- or γ-hydroxyalkylamide groups, but in addition can also contain single halogens and single sulphonamide groups and these sulphonamide groups can be unsubstituted or substituted on the nitrogen, for example by lower alkyl, such as methyl, ethyl, propyl or butyl, or lower hydroxyalkyl groups, such as 2-hydroxyethyl, 2-hydroxypropyl or 3-hydroxypropyl.

The dyes can, if desired, also be in the form of mixtures with one another or, if desired, with dyes of a different type, for example with non-metallisable azo dyes.

Suitable non-ionic compounds, having a hydrotropic action, of component (2) are, for example, reaction products, having a molecular weight of about 2,000 to 7,000, of ($a_1$) monohydric to hexahydric aliphatic alcohols having 1 to 6 carbon atoms, monoalkyl- or monoalkylol-monoamines or polyalkylenepolyamines and ($a_2$) 1,2-propylene oxide, reaction products of alkylene oxides and a water-insoluble aliphatic monoalcohol having at least 8 carbon atoms, reaction products of alkylene oxides and aryl- or alkyl-phenols, reaction products of saturated dicarboxylic acids having 3 to 10 carbon atoms and 1,2-propylene oxide or polypropylene glycols, reaction products of fatty acids having 10 to 18 carbon atoms and 1,2-propylene oxide or polypropylene glycols, reaction products of fatty acids having 10 to 18 carbon atoms, trihydric to hexahydric alcohols and 1,2-propylene oxide or reaction products of fatty acids having 10 to 18 carbon atoms, polyalkylenepolyamines and 1,2-propylene oxide.

The reaction products of ($a_1$) and ($a_2$) can have molecular weights of, in particular, 2,000 to 6,000 and preferably of about 2,000 to 4,000. As a rule, these reaction products are obtained by adding about 30 to 120 mols of 1,2-propylene oxide onto 1 mol of a monohydric to hexahydric aliphatic alcohol having 1 to 6 carbon atoms, a monoalkyl- or monoalkylol-monoamine or a polyalkylenepolyamine.

Examples of the monohydric to hexahydric alcohols are methyl alcohol, ethyl alcohol, propyl alcohol or butyl alcohol, ethylene glycol, di- and triethylene glycol, propylene glycol, dipropylene glycol, propane-1,3-diol, butane-1,2-, -1,3-, -1,4- and -2,3-diol, glycerol, trimethylolethane and trimethylolpropane, hexane-1,2,5- and -1,2,6-triol, 3-hydroxymethylpentane-2,4-diol, erythritol, pentaerythritol, dipentaerythritol, mannitol or sorbitol.

Preferred alcohols are dihydric to hexahydric alcohols having 2 to 6 carbon atoms, such as ethylene glycol, propylene glycol, glycerol, pentaerythritol, sorbitol, trimethylolethane and trimethylolpropane, and propylene glycol is particularly preferred.

The monoalkylmonoamines can contain 1 to 18, especially 1 to 6 and preferably 2 to 4 carbon atoms and are, for example, ethylamine, propylamine, octylamine, decylamine, dodecylamine, hexadecylamine or octadecylamine.

The monoalkylolmonoamines are as a rule those having 1 to 6, and preferably 2 to 4, carbon atoms, for example ethanolamine, propanolamine, isopropanolamine or butanolamine.

The polyalkylenepolyamines preferably have the formula $$H_2N(CH_2CH_2NH)_rCH_2CH_2NH_2 \quad (2)$$

in which r is 0 or a number from 1 to 3.

A large proportion of the compounds of component (2) are known commercially available products. Individual compounds are the 1,2-propylene oxide adducts with the following alcohols, monoamines and polyamines. The preferred average molecular weight is indicated in brackets. Ethylene glycol (2,000), propylene glycol (2,000) and (2,700), glycerol (3,000), (3,100) and (4,000), trimethylolpropane (2,500), (3,200), (4,000) and (6,300), ethylenediamine (3,600) and monoisopropanolamine (2,300), and also trimethylolpropane/1,2-propylene oxide/ethylene oxide (3,700).

Reaction products of an alkylene oxide and water-insoluble aliphatic monoalcohols having at least 8 carbon atoms, such as, the reaction products of 1,2-propylene oxide, for example those which contain 1 to 30 mols of added 1,2-propylene oxide, but especially reaction products of ethylene oxide with these alcohols, are also suitable as component (2). The alcohols can preferably contain 8 to 18 carbon atoms; they can be saturated or unsaturated, branched or straight-chain and can be employed on their own or as a mixture.

Naturally occurring alcohols, for example myristyl alcohol, cetyl alcohol, stearyl alcohol or oleyl alcohol, or synthetic alcohols, such as, in particular, 2-ethylhexanol, and also triethylhexanol, trimethylnonyl alcohol or the Alfols (tradename—Continental Oil Company) can be used. The Alfols are linear primary alcohols. The number behind the name indicates the average number of carbons in the alcohol; thus, for example, Alfol (1218) is a mixture of decyl alcohol, dodecyl alcohol, tetradecyl alcohol, hexadecyl alcohol and octadecyl alcohol. Further representatives are Alfol (810), (12), (16) and (18).

Preferred ethylene oxide reaction products can be represented, for example, by the following formula

$$R_3O(CH_2CH_2O)_sH \qquad (3)$$

in which $R_3$ is a saturated or unsaturated hydrocarbon radical, preferably an alkyl radical, having 8 to 18 carbon atoms and s is a number from 1 to 10. If s is a number from 1 to 3, the reaction products are as a rule water-insoluble, whilst the reaction products containing a larger number of ethylene oxide units are soluble in water. Examples of these products are the reaction products of, in particular, 2-ethylhexanol and also of lauryl alcohol, tridecyl alcohol, hexadecyl alcohol and stearyl alcohol with ethylene oxide.

Component (2) can also be a reaction product, which is sparingly soluble in water, of ethylene oxide and/or 1,2-propylene oxide and an alkylphenol having 4 to 12 carbon atoms in the alkyl moiety. These compounds preferably have the formula

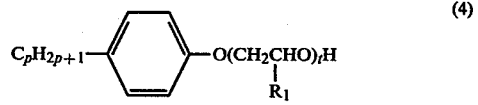

(4)

in which $R_1$ is hydrogen or methyl, p is a number from 4 to 12, preferably 8 to 9, and t is a number from 1 to 60, especially from 1 to 30 and preferably 1 to 3.

Individual octyl- and nonyl-phenol reaction products are those which follow: p-nonylphenol/30 mols of propylene oxide; p-octylphenol/2 mols of ethylene oxide; p-nonylphenol/3 mols of ethylene oxide; and p-nonylphenol/60 mols of 1,2-propylene oxide.

The arylphenol/alkylene oxide adducts are, in particular, o-phenylphenol/ethylene oxide adducts. The number of ethylene oxide units can be about 1 to 20 and preferably 2 to 10.

Reaction products of a saturated dicarboxylic acid having 3 to 10, and especially 6 to 10, carbon atoms and 1,2-propylene oxide or polypropylene glycols are also suitable as component (2). Dicarboxylic acids which can be used are, for example, malonic acid, succinic acid, glutaric acid, adipic acid, pimelic acid, suberic acid, azelaic acid or sebacic acid. Adipic acid and sebacic acid are preferred. The number of 1,2-propylene oxide units in the reaction products can be about 2 to 40. Finally, reaction products of fatty acids having 10 to 18 carbon atoms and 1,2-propylene oxide or polypropylene glycols can also be employed. The fatty acids can be saturated or unsaturated, for example capric acid, lauric acid, myristic acid, palmitic acid or stearic acid or decenoic acid, dodecenoic acid, tetradecenoic acid, hexadecenoic acid, oleic acid, linoleic acid, linolenic acid or ricinoleic acid. The number of 1,2-propylene oxide units in these esters can be about the same as that in the abovementioned reaction products.

Further reaction products which are suitable as component (2) are obtained from the abovementioned fatty acids having 10 to 18 carbon atoms, trihydric to hexahydric alcohols or polyalkylenepolyamines and 1,2-propylene oxide.

The trihydric to hexahydric alcohols preferably contain 3 to 6 carbon atoms and are, in particular, glycerol, trimethylolpropane, pentaerythritol and sorbitol. The polyalkylenepolyamines can be represented by the formula (2).

The reaction product of lauryl-sorbitol and 1,2-propylene oxide (molecular weight 2,500) and the reaction product of the polyaminoamide of the formula

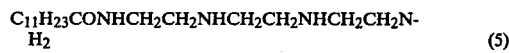

$$C_{11}H_{23}CONHCH_2CH_2NHCH_2CH_2NHCH_2CH_2NH_2 \qquad (5)$$

(lauric acid/triethylenetetramine) and 1,2-propylene oxide (molecular weight 2,600) may be mentioned as examples.

All of the compounds and reaction products mentioned as component (2) are either known or, in some cases, obtainable commercially or can be prepared by known methods commonly used by those skilled in the art.

The fatty acids and, in some cases, also fatty acid derivatives, for example fatty acid alkyl esters, which are suitable for the preparation of the reaction products of component (3) can be saturated or unsaturated and substituted or unsubstituted. Individual fatty acids are those which follow: caprylic acid, capric acid, lauric acid, myristic acid, palmitic acid, stearic acid, arachic acid, behenic acid, coconut fatty acid ($C_8$–$C_{18}$), decenoic acid, dodecenoic acid, tetradecenoic acid, hexadecenoic acid, oleic acid, linoleic acid, linolenic acid, ricinoleic acid, eicosenoic acid, docosenoic acid or clupanodonic acid.

Reaction products of lauric acid, stearic acid, oleic acid and especially coconut fatty acid and 1 to 2 mols, especially 2 mols, of diethanolamine are preferred. If desired, mixtures of the reaction products of component (3) can also be employed.

The compounds of component (4) are anionic compounds. The radical R-A- in the compounds of the formula (1) is derived, for example, from higher alcohols, such as decyl alcohol, lauryl alcohol, tridecyl alcohol, myristyl alcohol, cetyl alcohol, stearyl alcohol, oleyl alcohol, arachidyl alcohol or behenyl alcohol; and also from alicyclic alcohols, such as hydroabietyl alcohol; from fatty acids, such as caprylic acid, capric acid, lauric acid, myristic acid, palmitic acid, stearic acid, arachic acid, behenic acid, coconut fatty acid ($C_8$–$C_{18}$), decenoic acid, dodecenoic acid, tetradecenoic acid, hexadecenoic acid, oleic acid, linoleic acid, linolenic acid, eicosenoic acid, docosenoic acid or clupanodonic acid; from alkylphenols, such as butyl-, hexyl-, n-octyl-, n-nonyl, p-tert.-octyl, p-tert.-nonyl, decyl-, dodecyl-, tetradecyl- or hexadecyl-phenol, or from arylphenols, such as o- or p-phenylphenols. Radicals having 10 to 18 carbon atoms and especially those which are derived from the alkylphenols are preferred.

The acid radical X is as a rule the acid radical of a polybasic, especially low-molecular, mono- or di-carboxylic acid, for example of maleic acid, malonic acid, succinic acid or sulphosuccinic acid, or is a carboxyalkyl radical, especially a carboxymethyl radical (derived, in particular, from chloroacetic acid), and is bonded via an ether or ester bridge to the radical R-A-$(CH_2CHR_1O)_m$-. In particular, however, X is derived from inorganic polybasic acids, such as orthophosphoric acid and sulphuric acid. The acid radical X is preferably in the form of a salt, i.e. for example, in the form of an alkali metal, ammonium or amine salt. Examples of such salts are sodium, calcium, ammonium, trimethylamine, ethanolamine, diethanolamine or triethanolamine salts. The alkylene oxide units $-(CH_2CHR_1O)-$ in formula (1) are as a rule ethylene oxide and 1,2-propylene oxide units and the latter are preferably mixed with ethylene oxide units in the compounds of the formula (1).

The preparation of these compounds is effected by known methods by adding ethylene oxide, or alternately ethylene oxide and 1,2-propylene oxide in any order, onto the said alcohols, acids and alkylphenols and subsequently esterifying the reaction product and, if desired, converting the esters into their salts. The compounds of component (4) are known, for example from U.S. Patent Specification 3,211,514. Preferred compounds of the formula (1) are now those which have the formulae

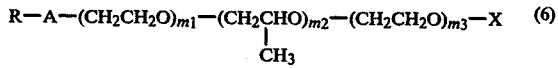

$$R-A-(CH_2CH_2O)_{m1}-(CH_2CHO)_{m2}-(CH_2CH_2O)_{m3}-X \quad (6)$$
$$\underset{CH_3}{|}$$

and especially

$$R-A-(CH_2CH_2O)_n-X \quad (7)$$

in which R, A and X are as defined, the sum of $m_1$, $m_2$ and $m_3$ is 2 to 20, the ratio of ethylene oxide groups to propylene oxide groups in compounds of the formula (6) is 1:(1 to 2) and preferably 1:1 and n is a number from 1 to 9 and preferably 1 to 5 or 1 to 4.

The anionic compounds of the formula

$$R_2O(CH_2CH_2O)_n-X \quad (8)$$

in which $R_2$ is a saturated or unsaturated hydrocarbon radical, o-phenylphenyl or alkylphenyl having 4 to 12 carbon atoms in the alkyl moiety and X and n are as defined, are also of particular interest.

Amongst the compounds which are derived from alkylphenol/ethylene oxide adducts, those of the formulae

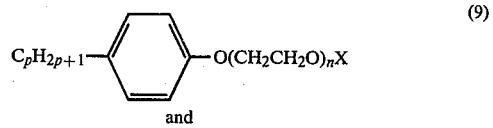

and

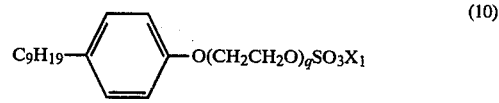

in which p is a number from 4 to 12, q is a number from 1 to 3 and $X_1$ is H, $NH_4^\oplus$ or an alkali metal cation and X and n are as defined, are also particularly preferred. At least one compound of component (4) and if desired a mixture of the said compounds is employed.

Water-soluble organic solvents having a boiling point of at least 80° C. which are suitable as component (5) and can be used on their own or as mixtures are, for example, the particularly preferred polyhydric alcohols which are liquid at room temperature, or the ethers and/or esters thereof, such as ethylene glycol, propylene glycol, di- and tri-ethylene glycol, glycerol, 2-methylpentane-2,4-diol, ethylene glycol monomethyl, monoethyl or monobutyl ether, propylene glycol monomethyl, monoethyl or monobutyl ether or diethylene glycol monomethyl, monoethyl or monobutyl ether, triethylene glycol monobutyl ether, dipropylene glycol, glycerol 1,3-diethyl ether, diethylene glycol monoethyl ether-acetate, thiodiglycol, polyethylene glycols and water-soluble polyethers.

Further preferred solvents are ketones and hydroxyketones, such as methyl ethyl ketone, acetonylacetone, diacetonealcohol, monoalcohols, which can contain ether groups, such as isopropyl alcohol, 2-hydroxymethyltetrahydropyrane, tetrahydrofurfuryl alcohol and glycerol formal (5-hydroxy-1,3-dioxane), phosphorus compounds, such as phosphoric acid esters or phosphonic acid esters, for example dimethyl methylphosphonate, and N,N,N',N'-tetramethylurea.

Furthermore, low -molecular aliphatic carboxylic acids, such as formic acid, acetic acid and lactic acid, low-molecular aliphatic carboxamides, such as formamide, N,N-dimethylformamide, N,N-dimethylacetamide and N,N-dimethylmethoxyacetamide, and alkanolamines, for example ethanolamine, are also suitable.

Furthermore, lactams and lactones, such as N-methylpyrrolidone, 1,5-dimethylpyrrolidone and γ-butyrolactone, liquid esters, such as ethyl lactate, diethylene glycol monoacetate and ethyl hydroxybutyrate, nitriles, which can contain hydroxyl groups, such as acetonitrile and β-hydroxypropionitrile, sulphur-containing compounds, such as sulpholane (=tetramethylenesulphone), sulpholene (=2,3- or 2,5-dihydrothiophene S-dioxide) and the derivatives thereof which are substituted in the α-position and/or β-position, especially by alkyl or hydroxyalkyl groups, dimethylsulphoxide, phosphoric acid amides, such as hexamethylphosphoric acid triamide, methylphosphonic acid bis-N,N-dimethylamide and also simple heterocyclic compounds, such as tetrahydrofurane, pyridine, dioxane and glycol formal (=1,3-dioxolane), can be used.

Conventional formulating agents can be, for example, inorganic salts, such as sodium chloride, sodium sulphate, sodium bisulphate, sodium carbonate or mono-, di- and tri-sodium phosphate, and also sodium benzenesulphonate, ligninsulphonates, dinaphthylmethanedisulphonates or their derivatives, sugars, dextrin or urea.

The concentrated liquid preparations according to the invention can contain, as further additives, foam-control assistants, for example silicone oils, and also substances which inhibit fungal and/or bacterial growth, and also acids or bases.

The liquid preparations are prepared by mixing the metal complex dyes, which preferably are sparingly soluble to insoluble in water, with components (2) and (3), (2) and (4) or (2), (3) and (4), in any order, in water, a water-soluble organic solvent or mixtures thereof, optionally in the presence of conventional formulating agents and further additives. Preferably, the procedure employed is to heat the mixture, with stirring, at room temperature (15° to 30° C.) or at temperatures of up to 130° C., for example at temperatures of 40° to 130° C. and preferably 40° to 80° C., depending on the nature of the solvent used, and then to allow it to cool to room temperatures. As a rule, the liquid preparations are true or colloidal solutions.

Liquid preparations which contain organic solvents advantageously have the following composition: 10 to 60, and preferably 10 to 20, percent by weight of component (1), 5 to 25, and preferably 5 to 20, percent by weight of component (2), 4 to 20, and preferably 5 to 20, percent by weight of component (3) and/or (4) and 20 to 80, and preferably 30 to 70, percent by weight of component (5), component (5) being a water-soluble organic solvent (or a mixture of such solvents) having a boiling point of at least 80° C. or a mixture of water and these solvents.

The weight ratio of component (2) to component (3) or (4), or to the two components, can preferably be about 2:1 to 1:3, whilst the ratio of components (3) and (4) to one another—if these are employed together—can be 4:1 to 1:2 and preferably 2:1 to 1:1.

A preferred liquid dye preparation contains, for example, 20 parts of the dye C.I. Acid Yellow 118, 6 parts of the adduct of o-phenylphenol and 8 mols of ethylene oxide, 6 parts of the reaction product of coconut fatty acid and 2 mols of diethanolamine (contains 1.5% of emulsified silicone oil as an antifoam), 24 parts of ethylene glycol monoethyl ether, 32 parts of diethylene glycol and 12 parts of water.

The percentages by weight are used on the total preparation and the sum of the constituents must add up to 100%.

The preparations have good stability on storage, i.e. they remain in a usable state for at least several months at temperatures of −20° to +60° C. and preferably of −10° to +40° C. When preparing padding liquors, dye baths, printing pastes and spray solutions, these preparations can be diluted with either water or organic solvents, without the dye, which is sparingly soluble to insoluble in water, precipitating out or other inhomogeneities arising. Textile materials made of naturally occurring or synthetic fibrous materials or leather can, for example, be dyed or printed in a known manner using the said padding liquors, dye baths, printing pastes and spray solutions.

The stable concentrated liquid dye preparations according to the invention are particularly suitable for spray-dyeing leather since they are miscible both with water (for example 1 part of concentrated dye preparation—4 to 9 parts of water) and with organic solvents, for example etherified glycols or nitro lacquers (for example consisting of 15% of nitrocellulose, 10% of synthetic resin, 5% of plasticiser, 20% of low-boiling solvents (methanol, acetone), 45% of solvents having medium boiling points (benzene) and 5% of high-boiling solvents (glycols) (Römpp's Chemie Lexikon (Römpp's Chemical Dictionary), 7th edition, 1974) without a change in the state of distribution (in the solution) of the dye arising.

As indicated, these mixtures should remain stable for several months, but especially over a period of about 3 to 14 days, i.e. for example, show no precipitation, crystallisation or agglomeration of the dye whatsoever. The mixtures should also not form multi-phase systems during this time.

The homogeneity of such mixtures should be retained in full during the said period. Precipitation of the dye in the mixture would have a highly troublesome effect in application (for example spray application), such as, for example, blocking of the spray jets, or would be discernible as bronzing of the dye on the surface of the leather.

If the liquid preparations according to the invention do not contain any organic solvents, they are as a rule suitable only for the preparation of aqueous padding liquors, dye baths and printing pastes but in some cases can also be employed for the preparation of organic dye baths or printing pastes. Their composition can preferably be indicated as follows: 10 to 20, and preferably 10 to 20, percent by weight of component (1), 10 to 70, and preferably 20 to 70 or 10 to 50 percent by weight of component (2), 5 to 50, preferably 10 to 50 and especially 5 to 25 percent by weight of component (3) and/or (4) and at least 5 percent by weight of water; the percentages by weight are based on the total preparation and the sum of the constituents must add up to 100%.

These aqueous concentrated preparations are also very stable and, in order to prepare, for example, dye liquors and padding liquors, can be diluted with water in any desired proportions.

In the following examples, the parts and percentages are by weight. Suitable reaction products for components (2), (3) and (4) are first given below.

| | |
|---|---|
| Component (2): | |
| $B_1$ | Ethylene glycol/1,2-propylene oxide reaction product Molecular weight 2,000 |
| $B_2$ | Propylene glycol/1,2-propylene oxide reaction product Molecular weight 2,000 |
| $B_3$ | Propylene glycol/1,2-propylene oxide reaction product Molecular weight 2,700 |
| $B_4$ | Glycerol/1,2-propylene oxide reaction product Molecular weight 3,000 |
| $B_5$ | Glycerol/1,2-propylene oxide reaction product Molecular weight 3,100 |
| $B_6$ | Glycerol/1,2-propylene oxide reaction product Molecular weight 4,000 |
| $B_7$ | Trimethylolpropane/1,2-propylene oxide reaction product Molecular weight 2,500 |
| $B_8$ | Trimethylolpropane/1,2-propylene oxide reaction product Molecular weight 3,200 |
| $B_9$ | Trimethylolpropane/1,2-propylene oxide reaction product Molecular weight 4,000 |
| $B_{10}$ | Trimethylolpropane/1,2-propylene oxide reaction product Molecular weight 6,300 |
| $B_{11}$ | Ethylenediamine/1,2-propylene oxide reaction product Molecular weight 3,600 |
| $B_{12}$ | Monoisopropanolamine/1,2-propylene oxide reaction product Molecular weight 2,300 |
| $B_{13}$ | Methanol (or 1-methoxy-1-propanol)/1,2-propylene oxide reaction product |

-continued

| | |
|---|---|
| B14 | Butanol/1,2-propylene oxide reaction product Molecular weight 3,000 |
| B15 | Sorbitol/1,2-propylene oxide reaction product Molecular weight 2,650 |
| B16 | Pentaerythritol/1,2-propylene oxide reaction product Molecular weight 3,000 |
| B17 | Methylethanolamine/1,2-propylene oxide reaction product Molecular weight 3,000 |
| B18 | Hexylamine/1,2-propylene oxide reaction product Molecular weight 3,000 |
| B19 | Triethanolamine/1,2-propylene oxide reaction product Molecular weight 3,650 |
| B20 | Triethylenetetramine/1,2-propylene oxide reaction product Molecular weight 3,050 |
| B21 | Dipropylenetriamine/1,2-propylene oxide reaction product Molecular weight 3,500 |
| B22 | Adduct of 30 mols of propylene oxide and 1 mol of nonylphenol |
| B23 | Reaction product of 3 mols of ethylene oxide and 1 mol of nonylphenol |
| B24 | Reaction product of 2 mols of ethylene oxide and 1 mol of nonylphenol |
| B25 | Reaction product of 1 mol of ethylene oxide and 1 mol of 2-ethylhexanol |
| B26 | Reaction product of 3 mols of ethylene oxide and 1 mol of stearyl alcohol |
| B27 | Reaction product of 1 mol of ethylene oxide and 1 mol of butylphenol |
| B28 | Reaction product of 10 mols of propylene oxide and 1 mol of dodecylphenol |
| B29 | Reaction product of 5 mols of ethylene oxide and 1 mol of 2-ethylhexanol |
| B30 | Reaction product of 8 mols of ethylene oxide and 1 mol of o-phenylphenol |
| B31 | Reaction product of 3 mols of ethylene oxide and 1 mol of tridecyl alcohol |
| B32 | Reaction product of 3 mols of ethylene oxide and 1 mol of hexadecyl alcohol |
| B33 | Reaction product of 2 mols of ethylene oxide and 1 mol of lauryl alcohol |
| B34 | Reaction product of 10 mols of ethylene oxide and 1 mol of 2-ethylhexanol |
| B35 | Reaction product of 1,2-propylene oxide and 1 mol of oleyl alcohol (molecular weight 2,000) |
| B36 | Reaction product of 60 mols of 1,2-propylene oxide and 1 mol of p-nonylphenol (molecular weight 3,700) |
| B37 | Reaction product of 1 mol of polypropylene glycol (molecular weight 2,000) and 1 mol of oleic acid |
| B38 | Reaction product of 2 mols of polypropylene glycol (molecular weight 1,000) and 1 mol of adipic acid |
| B39 | Reaction product of 1,2-propylene oxide and 1 mol of lauryl sorbitane ester (molecular weight 2,500) |
| B40 | Reaction product of propylene oxide and 1 mol of a polyaminoamide of the formula $C_{11}H_{23}CONHCH_2CH_2NHCH_2CH_2NHCH_2CH_2NH_2$ (molecular weight 2,600) |
| B41 | Reaction product of 1 mol of tributylphenol and 5 mols of ethylene oxide |
| B42 | Reaction product of 1 mol of nonylphenol and 6 mols of ethylene oxide |
| B43 | Reaction product of 1 mol of octylphenol and 4 mols of ethylene oxide |

Component (3):

| | |
|---|---|
| C1 | Reaction product of coconut fatty acid and 2 mols of diethanolamine |
| C2 | Reaction product of stearic acid and 2 mols of diethanolamine |
| C3 | reaction product of oleic acid and 2 mols of diethanolamine |
| C4 | Reaction product of methyl laurate and 1 to 2 mols of diethanolamine |

Anionic compounds (component 4):

| | |
|---|---|
| D1 | The ammonium salt of the acid sulphuric acid ester of the adduct of 2 mols of ethylene oxide and 1 mol of p-tert.-nonylphenol; |
| D2 | The ammonium salt of the acid sulphuric acid ester of the adduct of 3 mols of ethylene oxide and 1 mol of tridecyl alcohol; |
| D3 | The sodium salt of the acid maleic acid ester of the adduct of 2 mols of ethylene oxide and 1 mol of p-nonylphenol; |
| D4 | The ammonium salt of the acid sulphuric acid ester of the adduct of 3 mols of ethylene oxide and 1 mol of p-butylphenol; |
| D5 | The ammonium salt of the acid phosphoric acid ester of the adduct of 2 mols of ethylene oxide and 1 mol of p-nonylphenol; |
| D6 | The sodium salt of the carboxymethyl ether of the adduct of 4 mols of ethylene oxide and 1 mol of p-octylphenol; |
| D7 | The sodium salt of the di-sulphosuccinic acid ester of the adduct of 4 mols of ethylene oxide and 1 mol of p-octylphenol; |
| D8 | The ammonium salt of the acid sulphuric acid ester of coconut fatty acid diglycol; |
| D9 | The ammonium salt of the acid sulphuric acid ester of the adduct of 1 mol of ethylene oxide and 1 mol of stearyl alcohol; |
| D10 | The ammonium salt of the acid sulphuric acid ester of the adduct of 9 mols of ethylene oxide and 1 mol of p-nonylphenol; |
| D11 | The ammonium salt of the acid sulphuric acid ester of the adduct of 6 mols of ethylene oxide and 1 mol of p-nonylphenol; |
| D12 | The sodium salt of the monosulphosuccinic acid ester of the adduct of 2 mols of ethylene oxide and 1 mol of p-nonylphenol; |
| D13 | The ammonium salt of the acid sulphuric acid ester of the adduct of 1 mol of propylene oxide and 1 mol of ethylene oxide and 1 mol of nonylphenol; |
| D14 | The ammonium salt of the acid sulphuric acid ester of the adduct of 10 mols of propylene oxide and 10 mols of ethylene oxide and 1 mol of nonylphenol; |
| D15 | The ammonium salt of the acid sulphuric acid ester of the adduct of 6 mols of ethylene oxide and 1 mol of dodecylphenol; |
| D16 | The ammonium salt of the acid sulphuric acid ester of the adduct of 6 mols of ethylene oxide and 1 mol of pentadecylphenol; |
| D17 | The ammonium salt of the acid sulphuric acid ester of the adduct of 5 mols of ethylene oxide and 1 mol of tributylphenol; |
| D18 | The ammonium salt of the acid sulphuric acid ester of the adduct of 3 mols of ethylene oxide and 1 mol of Alfol (2022); |
| D19 | The ammonium salt of the acid sulphuric acid ester of the adduct of 2 mols of ethylene oxide and 1 mol of hydroabietyl alcohol; |
| D20 | The ammonium salt of the acid sulphuric acid ester of the adduct of 2 mols of ethylene oxide and 1 mol of octylphenol; |
| D21 | The ammonium salt of the acid sulphuric acid ester of the adduct of 50 mols of ethylene oxide and 1 mol of nonylphenol; |
| D22 | The ammonium salt of the acid sulphuric acid ester of the adduct of 35 mols of ethylene oxide and 1 mol of nonylphenol; |
| D23 | The ammonium salt of the acid sulphuric acid ester of the adduct of 15 mols of propylene oxide and 1 mol of nonylphenol; |
| D24 | The ammonium salt of the acid sulphuric acid ester of the adduct of 8 mols of ethylene oxide and 1 mol of o-phenylphenol; |
| D25 | The ammonium salt of the acid sulphuric acid ester of the adduct of 1 mol of ethylene oxide and 1 mol of 2-ethylhexanol; |
| D26 | The ammonium salt of the acid sulphuric acid ester of the adduct of 2 mols of ethylene oxide and 1 mol of coconut fatty acid; |
| D27 | The ammonium salt of the acid sulphuric acid ester of the adduct of 2 mols of propylene oxide and 1 mol of coconut fatty acid. |

EXAMPLE 1

20 parts of the dye of the formula

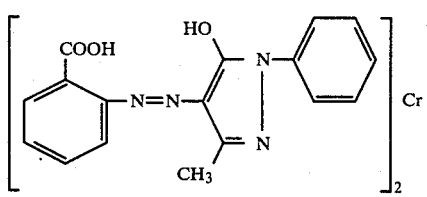

are initially introduced in the form of the dry product and 24 parts of ethylene glycol monoethyl ether, 32 parts of diethylene glycol, 6 parts of adduct $B_{30}$, 6 parts of reaction product $C_1$ (containing 1.5% of emulsified silicone oil as an anti-foam) and 12 parts of water are added with stirring. The mixture is warmed to 50° to 60° C. and stirred at this temperature for 2 hours. After switching off the heating, the mixture is allowed to cool, with stirring. The resulting solution contains no undissolved constituents. 98.5 parts of a dye solution are obtained and in a storage test (storage at temperatures of −20° C. to +60° C.) this proves to be very stable.

The dye solution thus obtained is also very stable in mixtures with water, organic solvents and water/solvent mixtures; the dye does not precipitate out. The following mixtures were tested:

(a) 1 part of dye solution and 4 to 9 parts of water (b) 1 part of dye solution and 2 parts of ethylene glycol monoethyl ether and 2 parts of isopropanol, (c) 5 parts of dye solution and 95 parts of nitro lacquer and (d) 5 parts of dye solution, 20 parts of water and 75 parts of nitro emulsion.

The dye did not precipitate out in any of these mixtures. These mixtures are suitable, for example, for dyeing leather. However, in the case of dye solutions without the said condensation products, the dye precipitates out after a short time on the addition of water.

In place of the dry crude dye, moist crude dye press-cakes having a solids content of at least 62.5% can also be employed.

Stable dye preparations are also obtained when the following compounds are mixed:

(1) 18 parts of the dye of the formula (101), 32 parts of diethylene glycol, 21 parts of $D_1$ (40% strength, aqueous), 21 parts of $B_{30}$, 8 parts of water and a small amount (less than 0.05%) of emulsified silicone oil (anti-foam)

(2) 18 parts of the dye of the formula (101), 24 parts of ethylene glycol monoethyl ether, 33 parts of diethylene glycol, 10.5 parts of $D_1$ (40% strength, aqueous), 10.5 parts of $B_{30}$, 4 parts of water and a small amount (less than 0.05%) of emulsified silicone oil (anti-foam).

In place of $B_{30}$ and $D_1$, one of the other components B and D can also be employed.

EXAMPLE 2

20 parts of the rhodamine B salt of the dye of the formula

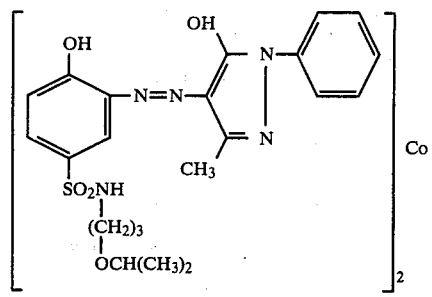

are introduced into a mixture of 32 parts of ethylene glycol monoethyl ether, 16 parts of diethylene glycol, 16 parts of adduct $B_{30}$ and 16 parts of reaction product $C_1$ (containing 1.8% of emulsified silicone oil as an anti-foam and 2.1% of acetic acid) at 50° to 60° C. and the resulting mixture is stirred at this temperature for 2 hours, the heating is then switched off and the mixture is stirred for a further 3 hours. The resulting solution (98.5 parts) contains no undissolved constituents. It is of low viscosity and highly homogeneous.

If this solution is diluted with water (4 to 9 parts of water per 1 part of dye solution), a clear solution forms and even after storing for 20 days at room temperature this still does not contain any precipitated dye.

This dye solution is also very stable when it is mixed as follows:

(a) 1 part of dye solution, 2 parts of ethylene glycol monoethyl ether and 2 parts of water, (b) 1 part of dye solution, 2 parts of ethylene glycol monoethyl ether and 2 parts of isopropanol, and (c) 5 parts of dye solution and 95 parts of nitro lacquer.

EXAMPLE 3

If, in Example 2, 32 parts of tetramethylurea are employed in place of 32 parts of ethylene glycol monoethyl ether, a solution of the dye is obtained which has very similar properties:

The dye solution is very stable in all of the mixtures mentioned in Example 2 and in addition it is also very stable in a nitro emulsion, for example in the following mixture: 5 parts of dye solution, 20 parts of water and 75 parts of nitro emulsion (nitro emulsion is a mixture of nitro lacquer, emulsifier and water).

EXAMPLE 4

100 kg of woollenserge fabric are wetted at 50° C. in a winch containing 4,000 l of water. 4,000 g of ammonium sulphate and 1,000 g of the preparation according to Example 3 are then added to the liquor. The liquor is then heated to the boil in the course of 40 minutes and dyeing is carried out at this temperature for one hour. The fabric is then rinsed, hydro-extracted and dried.

A level, fast red dyeing of the wool fabric results. A level dyeing with, at the same time, a good colour yield is also obtained with the following dye preparation: 20 parts of the dye of the formula (102), 32 parts of tetramethylurea, 16 parts of diethylene glycol, 8 parts of $B_{30}$, 8 parts of $C_1$ (contains 1.8% of emulsified silicone oil and 2.1% of acetic acid) and 16 parts of water.

EXAMPLE 5 (COMPARISON EXAMPLE)

If 20 parts of the dye used in Example 2 are introduced into a mixture of 53.3 parts of ethylene glycol monoethyl ether and 26.7 parts of diethylene glycol at 50° to 60° C. and the mixture is stirred for 2½ hours at this temperature and then for a further 2 hours without heating, left to stand for 12 hours and then stirred for a further 1 hour at room temperature, it is found that when the solution is passed through a DIN 80 sieve (mesh width 75 μm) about 5% (based on the weight of the solution) of crystalline residue remain on the sieve. In the course of a few days, a distinct growth of dye crystals can be observed in the sieved solution. If the dilution test is carried out with this solution (1 part of dye solution, 4 parts of water), an extensive dye precipitate of coarse flocks forms immediately.

This example shows that when components (2) and (3) are absent, it is not possible to prepare even a stable 20% strength solution of this dye in the solvents used. In addition, the solution is unstable on dilution with water. If tetramethylurea is used as the solvent in place of ethylene glycol monoethyl ether, a stable dye solution is obtained but the dye precipitates out from this virtually completely on dilution with water.

EXAMPLE 6

20 parts of copper phthalocyanine-tetraisopropoxypropylsulphamide and 80 parts of a mixture of 80 parts of $B_{29}$ and 20 parts of $D_1$ (40% strength, aqueous) are mixed with one another at room temperature, with stirring. A stable concentrated liquid and homogeneous dye preparation forms.

100 g each of fabrics made of wool, natural silk and polyamide and polyacrylonitrile fibrous materials are dyed in a laboratory dyeing apparatus as follows: the fabric, on a material carrier, is put into a liquor, which has been heated to 60° C., consisting of 3,000 g of water, 3 g of acetic acid and 10 g of the dye preparation. The dye liquor is then heated to the boil in the course of 30 minutes and left at this temperature for 1 hour. After the liquor has cooled, the fabrics are removed from the liquor, rinsed and dried.

This gives level turquoise-coloured dyeings of the fabrics employed. If the said fabrics are dyed with the same dye but without the indicated dyeing assistant mixture, these fabrics are stained only in spots and usable dyeings are not obtained.

Using the said dye, dyeing can also be carried out, again with good results, in the presence of the following dyeing assistant mixture: 75 parts of $B_{30}$ and 25 parts of $D_1$ (40% strength, aqueous).

EXAMPLE 7

20 parts of the 1:1-chromium complex of the dye of the formula

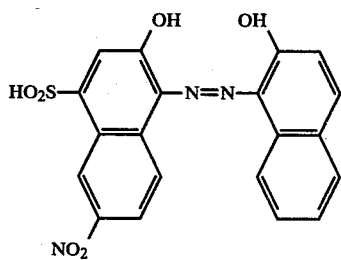

and 80 parts of a mixture of 25 parts of $B_{30}$, 25 parts of $C_1$ and 50 parts of water are mixed with one another at room temperature, with stirring. A concentrated, highly homogeneous dye preparation is obtained.

100 g of wool fabric are wetted in 3,000 g of water at 50° C. in a laboratory dyeing apparatus. With continuous agitation of the material, 1.5 g of sulphuric acid and 20 g of the dye preparation are added to the liquor, which is then brought to the boil in the course of 45 minutes and subsequently left at this temperature for 30 minutes. A further 2 g of sulphuric acid are added to the liquor and dyeing is continued for a further 30 minutes at the boil. After the liquor has cooled, the fabric is rinsed in the customary manner and then dried. A level blue dyeing of the wool fabric results.

If dyeing is carried out without the said dyeing assistant mixture, a severely bronzing blackish-violet dyeing results.

The following dyeing assistant mixtures are also suitable:

(a) 42.67 parts of $B_{30}$, 42.67 parts of $D_1$ (40% strength, aqueous), 14.23 parts of water and 0.43 part of emulsified silicone oil (anti-foam), (b) 32 parts of $B_3$, 32 parts of $D_1$ (40% strength, aqueous) and 36 parts of water, and (c) 25 parts of $B_{30}$, 50 parts of $D_{21}$ (50% strength, aqueous) and 25 parts of water.

EXAMPLE 8

18 parts of the 1:2 cobalt complex of the dye of the formula

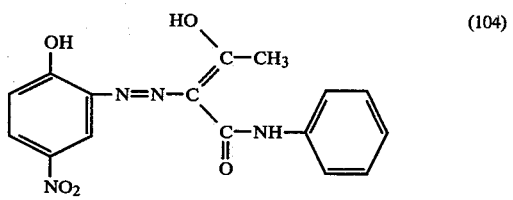

are initially introduced in the form of the dry product and 25 parts of tetramethylurea, 32 parts of diethylene glycol, 5 parts of adduct $B_{29}$, 6.7 parts of reaction product $C_1$ (containing 1.5% of emulsified silicone oil as an anti-foam), 3.3 parts of reaction product $C_2$ and 20 parts of water are added, with stirring. The mixture is warmed to 60° to 70° C. and kept at this temperature for 2 hours, with stirring. The mixture is then allowed to cool to room temperature.

The resulting solution contains no undissolved constituents. If 4 parts of water are added to 1 part of this solution, the solution remains stable for several days without the dye precipitating out. If reaction products $B_{29}$, $C_1$ and $C_2$ and the water are replaced by tetramethylurea, dye precipitates out after only a few hours in the dilution test with water.

EXAMPLE 9

13 parts of the iso-propylamine salt of the 1:2 cobalt complex of the dye of the formula

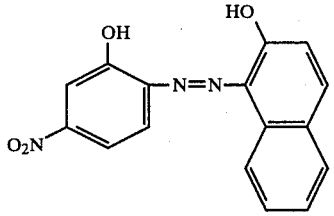 (105)

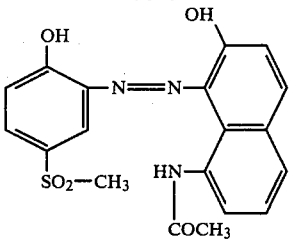 (107)

are initially introduced in the form of the dry product and 15 parts of butyrolactone, 15 parts of ethylene glycol monoethyl ether, 12 parts of diethylene glycol, 22.5 parts of adduct $B_{29}$, 5 parts of reaction product $C_1$ and 17.5 parts of water are added, with stirring. The mixture is warmed to 50° to 60° C. and kept at this temperature for 2 hours, with stirring, and is then stirred without further heating (the solution cools to virtually room temperature) for a further 3 hours.

This gives a homogeneous solution which contains no undissolved dye constituents.

If 1 part of this solution is diluted with 4 parts of water, no dye precipitates out of the solution even after several days.

If $B_{29}$, $C_1$ and the water in the solution described are replaced by butyrolactone, the dye precipitates out after a short time in the dilution test with water. Stable solutions having similarly good properties are also obtained when reaction product $B_{30}$ is employed in place of $B_{29}$.

EXAMPLE 10

13 parts of the dye of the formula (105) are initially introduced in the form of the dry product and mixed with 20 parts of butyrolactone, 15 parts of ethylene glycol monoethyl ether, 12 parts of diethylene glycol, 15 parts of $B_{29}$, 5 parts of $C_1$, 7 parts of $D_1$ and 13 parts of water and the mixture is then treated as described in Example 9.

The solution prepared in this way contains no undissolved constituents; it is homogeneous.

If, $B_{29}$, $C_1$ and $D_1$ and the water are replaced by an equivalent amount of a solvent mixture of the said solvents, the solution of the dye is also homogeneous immediately after the preparation; however, after a short time (about 1 day), the dye starts to crystallise out. This solution also has distinctly poorer characteristics than the solution which contains $B_{29}$, $C_1$ and $D_1$ in the dilution test with water (1 part of dye solution and 4 parts of water).

EXAMPLE 11

13 parts of the sodium salt of the 1:2 chromium complex of the dyes of the formulae

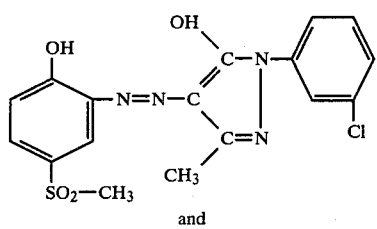 (106)

and (molar ratio 106:107=0.8:0.2) are initially introduced in the form of the dry product and mixed with 20 parts of butyrolactone, 15 parts of ethylene glycol monoethyl ether, 12 parts of diethylene glycol, 15 parts of $B_{29}$, 5 parts of $C_1$, 5 parts of $D_1$ and 15 parts of water and the mixture is treated as described in Example 9. This gives a homogeneous solution of the dye. If this solution is subjected to the dilution test with water (1 part of solution and 4 parts of water), the mixture remains stable for several days without any visible precipitates to be observed.

If $B_{29}$, $C_1$ and $D_1$ and the water are replaced by the solvent mixture (butyrolactone/ethylene glycol monoethyl ether/diethylene glycol), a homogeneous solution is again obtained but dye crystallises out from this after only a few days.

If this latter solution is diluted with water in a ratio of 1:4, a distinct sediment forms after only a few days.

The other components B, C and D which have been mentioned can also be employed in place of components $B_{29}$, $C_1$ and $D_1$.

What is claimed is:

1. A stable concentrated liquid preparation of a metal complex dye, which contains
   (1) 10 to 60 percent by weight of a 1:1 or 1:2 metal complex of an azo or azomethine dye, or a metallized phthalocyanine dye
   (2) 5 to 25 percent of a nonionic hydrotropic compound which is a reaction product
      (i) having a molecular weight of about 2,000 to 7,000 of ($a_1$) a monohydric to hexahydric alkanol of 1 to 6 carbon atoms, a monoalkyl- or monoalkylolmonoamine having 1 to 6 carbon atoms, or a polyalkylenepolyamine of the formula $H_2N(CH_2CH_2NH)_rCH_2CH_2NH_2$ wherein r is 0 to 3, and ($a_2$) 1,2-propylene oxide;
      (ii) of a water-insoluble saturated or unsaturated, branched or straight chain aliphatic monoalcohol of 8 to 18 carbon atoms and ethylene oxide, 1,2-propylene oxide or mixtures thereof;
      (iii) of a phenylphenol, or an alkylphenol having 4 to 12 carbon atoms in the alkyl moiety thereof, and ethylene oxide, 1,2-propylene oxide or mixtures thereof;
      (iv) of an alkylene dicarboxylic acid having 3 to 10 carbon atoms, and 1,2-propylene oxide or polypropylene glycol;
      (v) of a fatty acid having 10 to 18 carbon atoms, and 1,2-propylene oxide or polypropylene glycol;
      (vi) of a fatty acid having 10 to 18 carbon atoms, a trihydric to hexahydric alkanol having 3 to 6 carbon atoms and 1,2-propylene oxide; or
      (vii) of a fatty acid having 10 to 18 carbon atoms, a polyalkylenepolyamine of the formula $$H_2N(CH_2CH_2NH)_rCH_2CH_2NH_2$$

wherein r is 0 to 3, and 1,2-propylene oxide; and 4 to 20 percent by weight of at least one of the components (3) and (4), wherein component (3) is a reaction product of a fatty acid having 8 to 22 carbon atoms and 1 or 2 moles, per mole of fatty acid, of diethanolamine;

(4) is an anionic compound of the formula $$R-A-(CH_2CHO)_m-X$$
$$\underset{R_1}{|}$$

wherein R is an aliphatic hydrocarbon radical of 8 to 22 carbon atoms, or a cycloaliphatic, aromatic or aliphatic-aromatic hydrocarbon radical having 10 to 22 carbon atoms, $R_1$ is hydrogen or methyl, A is —O— or —COO—, X is an acid radical or an inorganic oxygen containing polybasic acid, the acid radical of a polybasic lower carboxylic acid or is —CH$_2$COOH, or a salt thereof, and m is 1 to 50;

(5) 20 to 80 percent by weight water, a water-soluble organic solvent having a boiling point of at least 80° C. or a mixture thereof; and in the further presence or absence of (6) one or more conventional dyestuff formulating agents selected from the group consisting of inorganic salts, sodium benzene sulfonate, lignin sulfonates, dinaphthylmethanedisulfonates, sugars, dextrin, urea, foam control assistants, fungal growth inhibitors, bacterial growth inhibitors, acids and bases;

and wherein the percentage weights of the components (1) to (6) are based upon the total preparation, the sum of the components adding up to 100%.

2. A preparation according to claim 1, wherein the metal complex is sparingly soluble to insoluble in water.

3. A preparation according to claim 1, which contains, as component (5), a water-soluble organic solvent having a boiling point of at least 80° C., or a mixture of water and this solvent.

4. A preparation according to claim 3, which contains 10 to 60 percent by weight of component (1), 5 to 20 percent by weight of component (2), 5 to 20 percent by weight of at least one of components (3) and (4) and 20 to 80 percent by weight of component (5), the percentages by weight being based on the total preparation and the sum of the constituents having to add up to 100%.

5. A preparation according to claim 3, which contains 10 to 20 percent by weight of component (1), 5 to 20 percent by weight of component (2), 5 to 20 percent by weight of at least one of components (3) and (4) and 30 to 70 percent by weight of component (5), the percentages by weight being based on the total preparation and the sum of the constituents having to add up to 100%.

6. A preparation according to claim 1, wherein m is 1 to 20 and component (5) is water.

7. A preparation according to claim 6, which contains 10 to 30 percent by weight of component (1), 10 to 70 percent by weight of component (2), 5 to 50 percent by weight of at least one of components (3) and (4) and at least 5 percent by weight of water, the percentages by weight being based on the total preparation and the sum of the constituents having to add up to 100%.

8. A preparation according to claim 7, which contains 10 to 30 percent by weight of component (1), 10 to 50 percent by weight of component (2), 10 to 50 percent by weight of at least one of components (3) and (4) and at least 5 percent by weight of water, the percentages by weight being based on the total preparation and the sum of the constituents having to add up to 100%.

9. A preparation according to claim 7, which contains 10 to 20 percent by weight of component (1), 20 to 70 percent by weight of component (2), 5 to 25 percent by weight of at least one of components (3) and (4) and at least 5 percent by weight of water, the percentages by weight being based on the total preparation and the sum of the constituents having to add up to 100%.

10. A preparation according to claim 1, wherein component (2) is a reaction product of ethylene glycol, propylene glycol, glycerol, trimethylolpropane, pentaerythritol, sorbitol, trimethylolethane or trimethylolpropane and 1,2-propylene oxide.

11. A preparation according to claim 1, wherein component (2) is a reaction product of a monoalkyl- or monoalkylolmonoamine having 1 to 6 carbon atoms or a polyalkylenepolyamine of the formula $$H_2N(CH_2CH_2NH)_rCH_2CH_2NH_2$$

in which r is 0 or a number from 1 to 3, and 1,2-propylene oxide.

12. A preparation according to claim 11, wherein component (2) is a reaction product of monoisopropanolamine or ethylenediamine and 1,2-propylene oxide.

13. A preparation according to claim 1, wherein component (2) is a reaction product of ethylene oxide or 1,2-propylene oxide or mixtures thereof, and an aliphatic, saturated or unsaturated, branched or straight chain monoalcohol having 8 to 18 carbon atoms.

14. A preparation according to claim 13, wherein component (2) is a compound of the formula $$R_3O(CH_2CH_2O)_sH$$

in which $R_3$ is a saturated or unsaturated hydrocarbon radical having 8 to 18 carbon atoms and s is a number from 1 to 10.

15. A preparation according to claim 1, wherein component (2) is a reaction product of ethylene oxide or 1,2-propylene oxide or mixtures thereof and an alkylphenol having 4 to 12 carbon atoms in the alkyl moiety.

16. A preparation according to claim 15, wherein component (2) is a compound of the formula

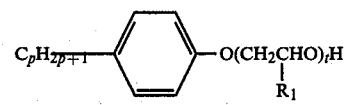

in which $R_1$ is hydrogen or methyl, p is a number from 4 to 12 and t is a number from 1 to 60.

17. A preparation according to claim 1, wherein component (2) is a reaction product of o-phenylphenol and 5 to 15 mols of ethylene oxide.

18. A preparation according to claim 1, wherein component (2) is a reaction product of an alkylene dicarboxylic acid having 3 to 10 carbon atoms and 1,2-propylene oxide or a polypropylene glycol.

19. A preparation according to claim 18, wherein component (2) is a reaction product of adipic acid or sebacic acid and 1,2-propylene oxide or a polypropylene glycol.

20. A preparation according to claim 1, wherein component (2) is a reaction product of a fatty acid having 10 to 18 carbon atoms and 1,2-propylene oxide.

21. A preparation according to claim 1, wherein component (2) is a reaction product of fatty acid having 10 to 18 carbon atoms, a trihydric to hexahydric alkanol having 3 to 6 carbon atoms and 1,2-propylene oxide.

22. A preparation according to claim 1, wherein component (2) is a reaction product of a fatty acid having 10 to 18 carbon atoms, a polyalkylenepolyamine of the formula $$H_2N(CH_2CH_2NH)_nCH_2CH_2NH_2$$

in which n is 0 to 3, and 1,2-propylene oxide.

23. A preparation according to claim 1, wherein component (3) is a reaction product of coconut fatty acid, lauric acid, oleic acid or stearic acid and 2 mols of diethanolamine.

24. A preparation according to claim 1, wherein component (4) is a compound of the formula $$R\text{-}A\text{-}(CH_2CH_2O)_n\text{-}X$$

in which n is a number from 1 to 9.

25. A preparation according to claim 24, wherein component (4) is a compound of the formula $$R_2O\text{-}(CH_2CH_2O)_n\text{-}X$$

in which $R_2$ is a saturated or unsaturated aliphatic hydrocarbon radical, o-phenylphenyl or alkylphenyl having 4 to 12 carbon atoms in the alkyl moiety.

26. A preparation according to claim 25, wherein component (4) is a compound of the formula

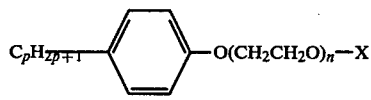

in which p is a number from 4 to 12.

27. A preparation according to claim 26, wherein component (4) is a compound of the formula

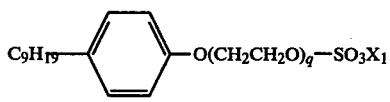

in which q is a number from 1 to 3 and $X_1$ is hydrogen, $NH_4$ or an alkali metal cation.

28. A preparation according to claim 1, wherein component (4) is a compound of the formula

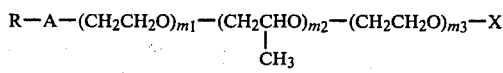

in which the sum of $m_1$, $m_2$ and $m_3$ is 2 to 20 and the ratio of ethylene oxide to propylene oxide units is 1:(1 to 2).

29. A preparation according to claim 1, wherein the compound of component (4) is in the form of an alkali metal, ammonium or amine salt.

30. A preparation according to claim 1, wherein component (5) is water, a polyhydric alcohol which is liquid at room temperature or an ether and/or ester thereof, tetramethylurea or a mixture of water and these solvents.

31. A preparation according to claim 1, which contains (1) 20 parts of the dye of the formula

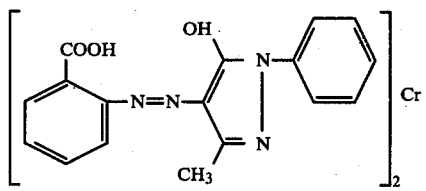

(2) 6 parts of the adduct of 8 mols of ethylene oxide and o-phenylphenol, (3) 6 parts of the reaction product of coconut fatty acid and 2 mols of diethanolamine and (5) 24 parts of ethylene glycol monoethyl ether, 32 parts of diethylene glycol and 12 parts of water.

32. A preparation according to claim 1, which contains (1) 20 parts of the dye of the formula

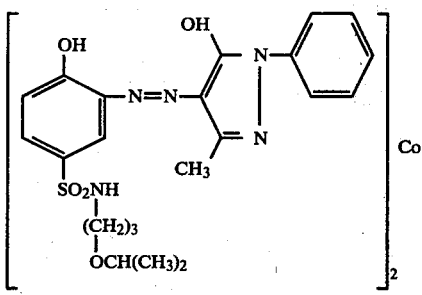

(2) 16 parts of the adduct of 8 mols of ethylene oxide and o-phenylphenol, (3) 16 parts of the reaction product of coconut fatty acid and 2 mols of diethanolamine, (5) 32 parts of ethylene glycol monoethyl ether, 16 parts of diethylene glycol and 4–9 parts of water.

* * * * *

UNITED STATES PATENT AND TRADEMARK OFFICE
CERTIFICATE OF CORRECTION

PATENT NO. : 4,322,415
DATED : MARCH 30, 1982
INVENTOR(S) : HEINZ ABEL, ET AL

It is certified that error appears in the above—identified patent and that said Letters Patent is hereby corrected as shown below:

Claim 1, Column 17, Line 19 reads:

-O- or -COO-, X is an acid radical or an inor-

Should read:

-- -O- or -COO-, X is an acid radical of an inor- --

Signed and Sealed this

Thirteenth Day of July 1982

[SEAL]

Attest:

Attesting Officer

GERALD J. MOSSINGHOFF

Commissioner of Patents and Trademarks